Feb. 14, 1961 N. K. PETERS ET AL 2,971,326
TEMPERATURE LIMITING SYSTEM FOR GAS TURBINE
EXHAUST AREA CONTROL
Filed Jan. 23, 1956
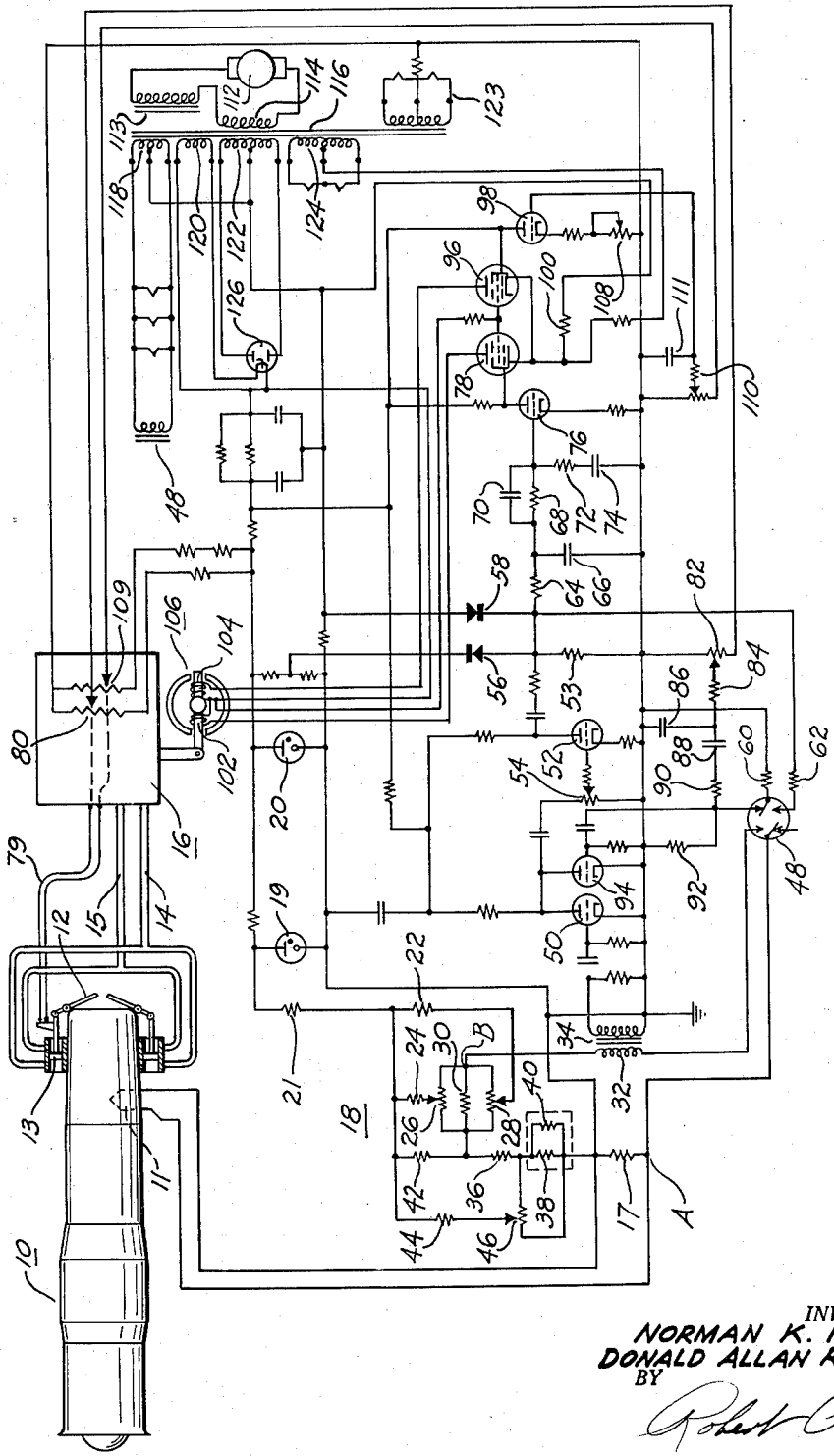
INVENTOR.
NORMAN K. PETERS.
DONALD ALLAN REYNICK.
BY

р

United States Patent Office 2,971,326
Patented Feb. 14, 1961

---

2,971,326

TEMPERATURE LIMITING SYSTEM FOR GAS TURBINE EXHAUST AREA CONTROL

Norman K. Peters and Donald A. Reynick, South Bend, Ind., assignors to The Bendix Corporation, a corporation of Delaware Filed Jan. 23, 1956, Ser. No. 560,670

3 Claims. (Cl. 60—35.6)

This invention relates to servo systems and more particularly to an electrical servo amplifier for providing a signal to a torque motor which acts to vary the exhaust nozzle area of a gas turbine engine in order to avoid over-temperatures.

Gas turbine engines are normally operated at temperatures which are very close to the maximum permitted by the materials used. Therefore, temperature controls for such engines must have very fast and accurate response to insure that over-temperatures do not occur, or that they will be small in magnitude and of the shortest possible duration. This problem is further complicated by the fact that afterburner and exhaust area varying mechanisms can cause drastic temperature changes within a very short time.

It is therefore an object of the present invention to provide an electrical servo amplifier for controlling the position of an exhaust area varying means which will respond to variations in an operating temperature input signal and provide a correcting signal almost instantaneously.

It is another object to provide a servo amplifier having means responding to changes in position of the exhaust area control to provide an anti-hunting correction and improve response.

It is another object to provide an electrical servo amplifier having an output system adapted to control the actuation of a torque motor.

It is a further object to provide an electrical servo amplifier which accomplishes the above objects and which can be made compact, light in weight and yet highly reliable.

Other objects and advantages will appear from perusal of the following specification taken in connection with the accompanying drawing in which:

The single figure is a schematic drawing of our exhaust area control amplifier.

Referring to the drawing, a gas turbine engine is shown generally at numeral 10 having a thermocouple 11 positioned therein for sensing tailpipe temperatures and having an exhaust area varying means 12 actuated by a number of hydraulically actuated pistons 13. Fluid is conducted to these pistons by means of conduits 14 and 15 and this flow is controlled through the action of a hydro-mechanical actuator and pump 16. These units may be similar to those shown in copending application Serial No. 568,630 filed in the names of Howard J. Williams and James E. Hurtle (common assignee). Control signals for the actuator 16 are provided by means of an electronic servo amplifier described below.

The voltage developed between the hot and cold junctions of the thermocouple 11 provides an input to the amplifier and is applied across a resistor 17. This resistor also supplies a means for insuring safe failure in the event of the loss of the thermocouple in that it causes the amplifier to see a large under-temperature signal, thus preventing the amplifier from driving the exhaust nozzle area varying means to a wide open position. The input signal is compared with a temperature compensated adjustable direct current reference signal from a reference circuit shown generally at numeral 18.

A source of direct current is supplied from the power supply which is regulated through the action of a pair of voltage regulator tubes 19 and 20 to the reference circuit 18 through a dropping resistor 21. This reference current is divided through the action of a pair of resistors 22 and 24 which are of roughly comparable value and supplied to a pair of potentiometers 26 and 28. These potentiometers, it will be observed, are connected in parallel with each other and with a resistor 30. One end of resistor 30 is connected to the top end of the primary winding 32 of an input transformer 34 and the other end is connected to the temperature signal resistor 17 through a small dropping resistor 36 and a cold junction compensating circuit consisting of a pair of resistors 38 and 40 connected in parallel. The function of the cold junction compensating circuit is to compensate the reference millivoltage in such manner as to compensate for temperature changes in the cold junction of the thermocouple. This requires a compensating resistor having an inverse temperature coefficient of resistivity. While such resistors are available, their variation in resistance with temperature is approximately a logarithmic function, so the second resistor in parallel is provided to more closely compensate for characteristics of the thermocouple. A pair of resistors 42 and 44, being of appreciably lower resistance than resistors 22 and 24 carry the greatest part of the regulated direct current and, in conjunction with a potentiometer 46, serve to establish a current level for resistors 38 and 40.

Inasmuch as the thermocouple signal is at a very low voltage, it is apparent that the reference signal must also be of very low voltage. This presents a difficulty in getting the desired range of adjustment or resolution on a reference potentiometer. For this reason, it was found desirable to employ the two potentiometers 26 and 28 in parallel with the reference resistor 30. These potentiometers are both of appreciably higher resistance than is resistor 30 and when connected to the regulated direct current source as shown provide a means of supplying both coarse and fine adjustment of the reference signal.

The thermocouple is connected to a junction A and develops across a resistor 17 a voltage indicative of engine tailpipe temperature. As set forth above, the temperature compensated reference voltage appears at point B. The circuit between point A and point B is completed through amplifier input transformer 34 when the left hand movable member of chopper 48 is in contact with the corresponding terminal immediately above it, i.e. the terminal connected to transformer 32. A comparison of these voltages takes place in this circuit and the current resulting from this comparison, which may be considered as a temperature error signal, will be of a magnitude and direction determined by the extent and direction of departure, respectively, of the thermocouple voltage from the reference voltage. The action of chopper 48 serves to modulate this current at power source frequency. A modulated temperature error signal thus appears on the secondary winding of transformer 34 and is amplified by two resistance-coupled vacuum tubes 50 and 52. A potentiometer 54, located in the grid circuit of tube 52 provides a means of adjusting amplifier gain. The amplified temperature error signal appearing at the anode of tube 52 and which is developed across a resistor 53 is then supplied to the demodulating section of chopper 48 which effectively grounds one-half of each cycle to rectify the signal. A pair of silicon diodes 56, 58 limit voltage across the chopper contacts to minimize the possibility of contact failure. A pair of resistors 60, 62 in the demodulation circuit suppress any high frequency noise resulting from chopper operation. The rectified signal is filtered in a circuit consisting of a resistor 64 and a capacitor 66. This signal is then supplied to a stabilization circuit consisting of a resistor 68 and a capacitor 70 in parallel and a resistor 72 and a capacitor 74 in series. It is the function of this circuit to stabilize the dynamic characteristics of the amplifier and associated system. This filtered and stabilized signal is then supplied to the grid of a vacuum tube 76 which serves as a driver for an output tube 78. Polarity of the signal supplied to tube 76 is either positive or negative with respect to ground depending upon whether the temperature input signal is greater or less than the temperature reference.

The area rate signal modifies the temperature error signal to provide a stabilization or anti-hunting function and is established through the action of the actuating pistons 13 which drive a feedback cable 79 connected to an area rate potentiometer 80 in the nozzle area control 16. The signal from potentiometer 80 is a direct current voltage proportional to exhaust nozzle area. This signal is supplied to the electronic control through a gain control potentiometer 82, a filter network consisting of resistor 84 and capacitor 86, and a differentiating circuit consisting of capacitor 88 and resistors 90 and 92. The direct current output of this differentiating circuit is proportional to rate of change of exhaust nozzle area. This signal is modulated by chopper 48 which converts it to a square wave alternating voltage. The resulting alternating current area rate signal is amplified in vacuum tube 94 and is mixed with the temperature error signal in the anode circuit common to tubes 94 and 50. It is the function of this circuit to minimize the effects of hysteresis and backlash in the area control system and provide velocity control of nozzle area movement.

The output of the present temperature control is a differential current equal to the difference in plate currents of tube 78 and an additional output tube 96. The grid voltage of output tube 78 is controlled by the net temperature error signal supplied the grid of driver tube 76. This tube is driven more or less positive with respect to ground, depending on whether the grid of tube 76 is negative or positive with respect to ground. Similarly, the grid of tube 96 is driven more or less positive by a temperature reset signal supplied to the grid of a driver tube 98. A resistor 100 in the cathode circuit of tubes 78 and 96 holds the net grid to cathode voltage of each tube at a negative value, thus preventing grid current flow. When equal voltage is supplied the grids of tubes 78 and 96, equal plate currents flow in each tube. When the current in tube 78 is increased, due to an increase in grid voltage, the voltage across resistor 100 tends to increase. Since this resistor is also in the grid to cathode circuit of tube 96, the current in tube 96 is reduced by an amount approximately equal to the increase in tube 78. Conversely, a change in grid voltage in tube 96 causes approximately equal and opposite plate current changes in tubes 78 and 96. This change in conduction of the output tubes results in an unbalance of the output current and a differential output applied to the windings 102, 104 of a torque motor 106. The net energization and resulting deflection of the armature of the torque motor is proportional to the amount of unbalance. When equal current is conducted by both tubes, output to both windings of the torque motor is equal and the torque motor is at a null condition. The temperature error signal supplied tube 78 thus becomes the primary control of the differential output current, with the tube 96 acting to complement the action of tube 78. A potentiometer 108 in the cathode circuit of tube 104 provides a means for removing unbalance in the output and driver tubes.

The temperature reference reset signal is a direct current voltage feedback to the electronic control that is proportional to exhaust nozzle area and originates in a potentiometer 109 in actuator 16. This signal is supplied through a stabilization network consisting of a resistor 110 and a capacitor 111 to the grid of tube 98, thence to tube 96 changing the current differential in tubes 78 and 96. Thus, the amount of output circuit unbalance and the resulting differential output current to the torque motor reflects exhaust nozzle area. This reset signal effectively reduces the reference temperature of the control. The basic reference signal, supplied by circuit 18, is in no way affected by the reset signal and remains constant. However, the temperature reset signal supplied to tube 98 causes tube 96 to become more conductive; tube 78 thus becomes less conductive and the output circuit effectively sees an over-temperature condition.

During engine operation in the afterburning range, turbine outlet temperature tends to rise above the desired maximum on-temperature condition. Combined nozzle area control and temperature control action increases exhaust nozzle area sufficiently to relieve this over-temperature condition. Simultaneously, nozzle feedback applied through the temperature reset potentiometer 109 supplies a temperature reset signal to the electronic control proportional to the exhaust nozzle area.

The power supply for this control system is believed to be conventional, for the most part, and is shown merely for completeness. An alternating current voltage is generated by means of an alternator 112 which is driven by the engine. This alternator produces a voltage varying in voltage and frequency with alternator drive speed. A regulator reactor 113 in series with the primary winding 114 of a power transformer 116 regulates alternator output to supply a relatively constant current and voltage to winding 114. Power transformer 116 has five secondary windings 118, 120, 122, 123 and 124 which supply required alternating current voltages. Windings 118, 120, 123 and 124 supply tube heater current in a conventional manner. Winding 118 also provides excitation for chopper 48. Winding 122 provides an alternating current voltage which is rectified by means of a full-wave rectifier tube 126 to provide the required direct current voltages in the system including the regulated direct current supplied to the temperature reference circuit 18. Rectified voltage for the anode circuits of the output tubes 78 and 96 is supplied through the windings 98 and 102 of the torque motor 100.

While only one embodiment is shown and described herein, various changes in arrangement of parts and components may be made without departing from the scope of the invention.

We claim:

1. A system for controlling temperature in an aircraft engine equipped with a variable area exhaust nozzle and mechanism for actuating said nozzle comprising means for creating a signal representing actual engine operating temperature, circuit means for creating a signal representing a desired operating temperature including a resistor having an inverse temperature coefficient of resistivity and a voltage dividing means, means for comparing said signals thereby creating a temperature error signal, a chopper for modulating said temperature error signal, means for amplifying said temperature error signal including a plurality of electrical amplification stages including an output stage, means responsive to said amplified temperature error signal operatively associated with said mechanism including an electro-responsive device, a stabilization circuit for creating a signal varying with rate of change of movement of said mechanism including a voltage divider and a capacitor and means connecting said rate of change signal to one of said stages, and an additional stabilization circuit for creating a signal varying with position of said mechanism including a voltage divider operatively connected to said mechanism and electrical amplification means for amplifying the signal from said voltage divider including an output stage, said output stages being connected in a differential arrangement to provide a driving signal for said electro-responsive means.

2. In a system for controlling temperature in an aircraft engine equipped with a variable exhaust nozzle and mechanism for actuating said nozzle comprising means for creating a signal representing actual engine operating temperature means for creating a signal representing a desired operating temperature, means for comparing said signals thereby creating a temperature error signal, a modulating device for changing said error signal to a pulsating signal, transformer means for converting said pulsating signal to an alternating current signal, means for amplifying said alternating current signal, a pair of driver amplifying devices, one of which is connected to said amplifying means, a pair of output amplifying devices connected to said driver amplifying devices, a torque motor device connected to said mechanism and arranged to be controlled by a differential in output of said output amplifying devices, and a stabilization circuit for creating a signal varying with rate of change of movement of said mechanism including a voltage divider and a capacitor and means connecting said rate of change signal to said amplifying means.

3. A system for controlling temperature in an aircraft engine as set forth in claim 2 including means for creating a signal varying with the position of said mechanism, and means for connecting said signal to the other of said driver amplifying devices.

References Cited in the file of this patent

UNITED STATES PATENTS

| | | |
|---|---|---|
| 2,667,228 | Wood et al. | Jan. 26, 1954 |
| 2,697,908 | Offner | Dec. 28, 1954 |
| 2,699,524 | Jackson et al. | Jan. 11, 1955 |
| 2,699,646 | Baker | Jan. 18, 1955 |
| 2,705,864 | Peters | Apr. 12, 1955 |
| 2,706,383 | Jacobson | Apr. 19, 1955 |
| 2,734,340 | Wood | Feb. 14, 1956 |
| 2,739,441 | Baker et al. | Mar. 27, 1956 |
| 2,760,337 | Ciscel et al. | Aug. 28, 1956 |
| 2,776,536 | Chudyk | Jan. 8, 1957 |
| 2,805,542 | Boykin | Sept. 10, 1957 |
| 2,805,544 | Wells | Sept. 10, 1957 |